United States Patent
Shin et al.

(10) Patent No.: US 11,572,278 B2
(45) Date of Patent: Feb. 7, 2023

(54) METHOD OF FORMING GRAPHENE

(71) Applicant: Samsung Electronics Co., Ltd., Suwon-si (KR)

(72) Inventors: Hyeonjin Shin, Suwon-si (KR); Keunwook Shin, Yongin-si (KR); Changhyun Kim, Seoul (KR); Seunggeol Nam, Suwon-si (KR); Kyung-Eun Byun, Seongnam-si (KR); Hyunjae Song, Hwaseong-si (KR); Eunkyu Lee, Yongin-si (KR); Changseok Lee, Seoul (KR); Alum Jung, Suwon-si (KR); Yeonchoo Cho, Seunnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 260 days.

(21) Appl. No.: 16/675,350

(22) Filed: Nov. 6, 2019

(65) Prior Publication Data
US 2020/0140279 A1    May 7, 2020

(30) Foreign Application Priority Data

Nov. 6, 2018 (KR) .................. 10-2018-0135330

(51) Int. Cl.
*B32B 9/00* (2006.01)
*C01B 32/186* (2017.01)
*B82Y 30/00* (2011.01)

(52) U.S. Cl.
CPC ............ *C01B 32/186* (2017.08); *B82Y 30/00* (2013.01); *Y10T 428/30* (2015.01)

(58) Field of Classification Search
CPC ........ Y10T 428/30; B32B 9/007; B82Y 30/00; B82Y 40/00; C01B 32/194; C01B 32/186
USPC ...................................... 428/408; 423/447.1
See application file for complete search history.

(56) References Cited

U.S. PATENT DOCUMENTS

2016/0225991 A1* 8/2016 Schwab .............. H01L 51/0002

FOREIGN PATENT DOCUMENTS

| KR | 101138141 B1 | 4/2012 |
| KR | 101433226 B1 | 8/2014 |
| KR | 20160107871 A | 9/2016 |
| KR | 20170114339 A | 10/2017 |
| KR | 20170130784 A | 11/2017 |

* cited by examiner

*Primary Examiner* — Daniel H Miller
(74) *Attorney, Agent, or Firm* — Harness, Dickey & Pierce, P.L.C.

(57) ABSTRACT

A method of growing graphene includes forming a carbon monolayer on a substrate by injecting a first reaction gas into a reaction chamber, wherein the first reaction gas includes a first source including a component that is a carbon source and belongs to an electron withdrawing group, and injecting a second reaction gas including a second source into the reaction chamber, wherein the second source includes a functional group that forms a volatile structure by reacting with a component that belongs to an electron withdrawing group. Graphene may be directly grown on a surface of the substrate by repeatedly injecting the first reaction gas and the second reaction gas.

19 Claims, 5 Drawing Sheets

METHOD OF FORMING GRAPHENE

CROSS-REFERENCE TO RELATED APPLICATION

This application claims the benefit of Korean Patent Application No. 10-2018-0135330, filed on Nov. 6, 2018, in the Korean Intellectual Property Office, the disclosure of which is incorporated herein in its entirety by reference.

BACKGROUND

1. Field

The present disclosure relates to methods of forming graphene, and more particularly, to methods of directly growing graphene on a substrate.

2. Description of the Related Art

Graphene is a crystalline material having a hexagonal honeycomb structure in which carbon atoms are two dimensionally connected, and has a very small thickness as thin as a level of an atom size. Graphene may be synthesized by using a chemical vapor deposition (CVD) method or obtained by detaching graphite layer-by-layer.

SUMMARY

Provided are methods of directly growing graphene on a substrate.

Additional aspects will be set forth in part in the description which follows and, in part, will be apparent from the description, or may be learned by practice of the presented embodiments.

According to an aspect of an embodiment, a method of forming graphene, the method includes: forming a carbon monolayer on a substrate by injecting a first reaction gas into a reaction chamber, wherein the first reaction gas includes a first source being a carbon source and including a component that belongs to an electron withdrawing group; and injecting a second reaction gas including a second source into the reaction chamber, wherein the second source includes a functional group that forms a volatile structure by reacting with the component that belongs to an electron withdrawing group, wherein graphene is directly grown on a surface of the substrate by repeatedly injecting the first reaction gas and the second reaction gas.

The first source may include a component that belongs to an electron withdrawing group in which an electronegativity difference between a carbon atom and a functional group is greater than that of between carbon and hydrogen.

The component that belongs to an electron withdrawing group of the first source may include at least one functional group selected from the group consisting of amine, thiol, alcohol, carboxyl, carbonyl, amide, and halogen.

The second source may include a hydrogen component.

The second source may be a hydrogen source or a carbon source including a hydrogen component.

The carbon source including the hydrogen component of the second source may include at least one of an aliphatic compound having a carbon number in a range from 1 to 10 and an aromatic compound having a carbon number in a range from 1 to 16.

The second source may include at least one selected from the group consisting of $H_2$, $CH_4$, $C_2H_4$, $C_2H_2$, and $C_6H_6$.

The method may further include evacuating of a residual gas between the injections of the first reaction gas and the second reaction gas.

At least one of the first reaction gas and the second reaction gas may further include at least one of a reducing gas, an oxidizing gas, and an inert gas.

The method may further include heat treating, wherein the graphene may be directly grown on the substrate through the heat treating.

A plasma process may be selectively and additionally applied with respect to the injection of at least one of the first reaction gas and the second reaction gas.

The inert gas may include at least one of an argon gas, a neon gas, a nitrogen gas, a helium gas, a krypton gas, and a xenon gas.

The first source may include at least one of an aliphatic compound having a carbon number in a range from 1 to 10 and an aromatic compound having a carbon number in a range from 1 to 16.

The substrate may include at least one of a Group IV semiconductor material, a semiconductor compound, a metal, and an insulating material.

The Group IV semiconductor material may include Si, Ge, or Sn.

The semiconductor compound may include a material in which at least two of Si, Ge, C, Zn, Cd, Al, Ga, In, B, C, N, P, S, Se, As, Sb, and Te are combined.

The metal may include at least one of Cu, Mo, Ni, Al, W, Ru, Co, Mn, Ti, Ta, Au, Hf, Zr, Zn, Y, Cr, and Gd or an alloy of these metals.

The insulating material may include at least one of Si, Al, Hf, Zr, Zn, Ti, Ta, W, and Mn or at least one of oxide, nitride, and carbide of at least one of Si, Ni, Al, W, Ru, Co, Mn, Ti, Ta, Au, Hf, Zr, Zn, Y, Cr, Cu, Mo, and Gd and a derivative of these materials.

The at least one of the oxide, nitride, and carbide, and the derivative of these materials may further include hydrogen.

The process of directly growing graphene on the surface of the substrate may be performed at a temperature equal to or less than 2000° C.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings. In the drawings, like reference numerals refer to like elements throughout, and, sizes of constituent elements may be exaggerated for convenience of explanation and clarity. The present embodiments may have different forms and should not be construed as being limited to the descriptions set forth herein.

It will be understood that when an element or layer is referred to as being "on" or "above" another element or layer, the element or layer may be directly on another element or layer or intervening elements or layers. As used herein, the singular forms include the plural forms as well, unless the context clearly indicates otherwise. It should be understood that, when a part "comprises" or "includes" an element in the specification, unless otherwise defined, it is not excluding other elements but may further include other elements. In the specification (especially, in the claims) the term "above" and similar directional terms may be applied to both singular and plural.

Graphene is a material having a hexagonal honeycomb structure in which carbon atoms are two dimensionally connected, and has a very thin thickness as a level of an atom size. Graphene has a high electrical mobility and a high thermal characteristic compared to silicon Si, and has advantages that graphene is chemically stable and has a wide surface area. In the embodiments below, a method of directly growing graphene on a surface of a substrate by using a CVD process or a plasma-enhanced chemical vapor deposition (PECVD) process will be described.

FIGS. 1A through 1F are cross-sectional views for explaining a method of forming graphene, according to an embodiment.

Figure 1A:
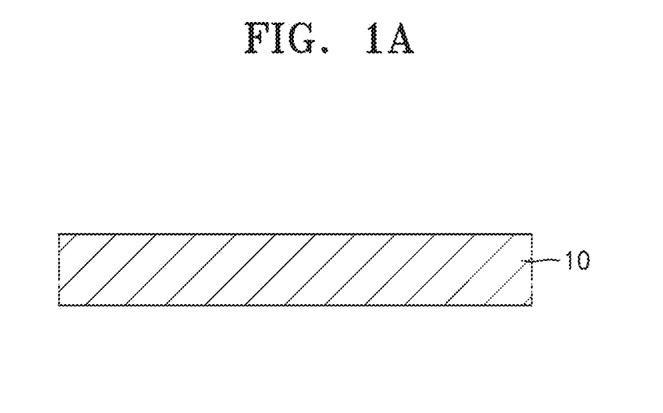
FIGS. 1A through 1F are cross-sectional views for explaining a method of forming graphene, according to an embodiment.

Referring to FIG. 1A, first, a substrate 10 for growing graphene is prepared in a reaction chamber (not shown). In some embodiments, the substrate 10 used for growing graphene may be a substrate of various materials. For example, the substrate 10 may include at least one of a Group IV semiconductor material, a semiconductor compound, a metal, an insulating material, and two dimensional materials of different types.

In detail, the Group IV semiconductor material may include Si, Ge, or Sn. The semiconductor compound may include a material in which at least two elements of, for example, Si, Ge, C, Zn, Cd, Al, Ga, In, B, C, N, P, S, Se, As, Sb, and Te, are combined. The metal may be at least one of, for example, Cu, Mo, Ni, Al, W, Ru, Co, Mn, Ti, Ta, Au, Hf, Zr, Zn, Y, Cr, and Gd or an alloy of these metals. The insulating material may include at least one of Si, Al, Hf, Zr, Zn, Ti, Ta, W, and Mn or at least one of oxide, nitride, and carbide of at least one of Si, Ni, Al, W, Ru, Co, Mn, Ti, Ta, Au, Hf, Zr, Zn, Y, Cr, Cu, Mo, and Gd and a derivative of these materials. The at least one of the oxide, nitride, carbide, and the derivative of these materials may further include hydrogen. The substrate 10 may further include a dopant. The two dimensional materials of different types may be one of a layer material, such as TMD, h-BN, Perovskite, etc. The materials described above for the substrate 10 are examples, and the substrate 10 may include various different materials.

The substrate 10 may be, for example, pre-treated before performing a process for growing graphene. For example, the substrate 10 may be pretreated by injecting a pre-treatment gas into the reaction chamber. At this point, the substrate 10 may be pre-treated by generating gas-plasma in the reaction chamber by applying a bias power having a predetermined or alternatively, desired, magnitude to the substrate 10 and applying power for generating plasma in the reaction chamber from a plasma power source (not shown). At this point, the pre-treatment gas injected into the reaction chamber in the pre-treatment process of the substrate 10 may be a reducing gas. The reducing gas may be, for example, at least one of hydrogen, nitrogen, chlorine, fluorine, ammonia, and a derivative of these gases. However, embodiments are not limited thereto. Also, an inert gas may be additionally injected into the reaction chamber besides the reducing gas. The inert gas may include at least one of, for example, an argon gas, a neon gas, a helium gas, a krypton gas, and a xenon gas. In this way, when a reducing gas (or a mixture gas of the reducing gas and the inert gas) flows into the reaction chamber, the reducing gas is changed to a plasma state by an electric field that is formed by applying plasma power. A surface of the substrate 10 may be treated by the generated plasma of the reducing gas. The process of pretreating the substrate 10 may be performed in a state that a predetermined or alternatively, desired, voltage is applied to the substrate 10. However, embodiments are not limited thereto, and a voltage need not be applied to the substrate 10. Accordingly, impurities or oxygen remaining on the surface of the substrate 10 may be removed. When the pre-treatment process of the substrate 10 is completed, gases or impurities remaining in the reaction chamber may be evacuated to the outside of the reaction chamber. In some embodiments, the pre-treatment process of the substrate 10 may be omitted.

Figure 1B:
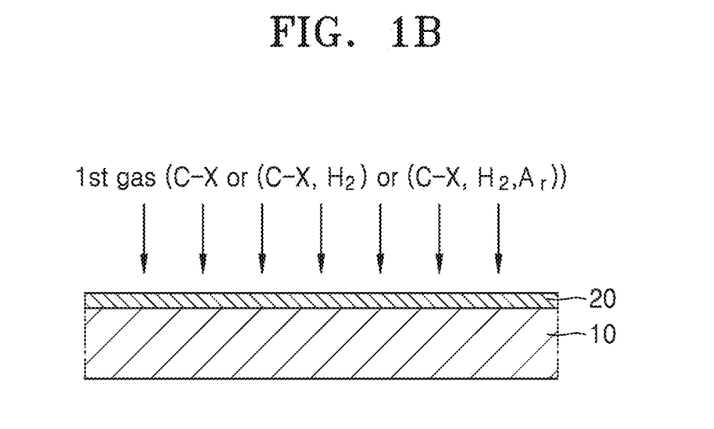

Next, referring to FIG. 1B, a carbon mono-layer 20 may be formed on the substrate 10 by injecting a first reaction gas including a carbon source as a first source into the reaction chamber.

At this point, the first source may be a carbon source and may include a component that belongs to an electron withdrawing group. That is, the first source may have a C—X structure of carbon and a component that belongs to the electron withdrawing group. X indicates a component that belongs to an electron withdrawing group in which an electronegativity difference between carbon atoms and a functional group is greater than that of between carbon and hydrogen (C—H). At this point, the first source as a carbon source may include an aliphatic compound having a carbon number in a range from 1 to 10 and/or an aromatic compound having a carbon number in a range from 1 to 16. The carbon source used as the first source may supply carbon for growing graphene.

The first source may include, for example, at least one functional group G selected from the group consisting of amine, thiol, alcohol, carboxyl, carbonyl, amide, and halogen as a component that belongs to an electron withdrawing group. For example, the first source may include at least one selected from the group consisting of $NH_2$, SH, OH, COOH, and Cl as a component that belongs to an electron withdrawing group. For example, $CCl_4$ may be used as the first source. Besides the above, the first source may include various carbon sources including various components that belong to an electron withdrawing group.

The first source having the C—X structure may be spontaneously separated due to a large electronegativity difference between carbon atoms and a functional group.

Accordingly, since the first source may be activated by the spontaneous separation of the functional group, the carbon mono-layer 20 may be formed on the substrate 10 by using the first source using a CVD process. As other embodiments will be described below, after activating the first source by using a plasma method, the carbon mono-layer 20 may be formed on the substrate 10 by using the first source using a plasma CVD process.

For example, when $CCl_4$ is used as the first source, the activated first source may have a $CCl_3$ structure, and carbon C of the activated first source may be adsorbed onto the substrate 10. At this point, since a functional group, that is, $Cl_3$ of the activated first source, is combined with the carbon C adsorbed onto the substrate 10, a secondary adsorption of carbon that has reactivity with $Cl_3$ is impossible, and thus, a secondary adsorption of carbon may be controlled. Therefore, an atomic layer, that is, the carbon mono-layer 20, may be formed by the first source. At this point, the carbon mono-layer 20 may include an amorphous or a hexagonal structure.

As described above, when a carbon source having a functional group of a component that belongs to an electron withdrawing group is used, a secondary adsorption of carbon may be controlled, and thus, as described below, graphene may be grown layer-by-layer.

The first reaction gas may further include at least one of a reducing gas, an oxidizing gas, and an inert gas in addition to the first source having a C—X structure including a component that belongs to an electron withdrawing group. For example, the first reaction gas may further include a hydrogen gas which is a reducing gas in addition to the first source having a C—X structure including a component that belongs to an electron withdrawing group. That is, the first reaction gas may include only the first source having a C—X structure including a component that belongs to an electron withdrawing group or may further include a hydrogen gas in addition to the first source having the C—X structure. Also, the first reaction gas may further include a hydrogen gas and an argon gas which is an inert gas in addition to the first source that has a C—X structure including a component that belongs to an electron withdrawing group. In this way, when the first reaction gas further includes the hydrogen gas, a component separated from the first source while the first source is activated combines with the hydrogen gas, and the combination of separated component and the hydrogen gas are changed to a gas state, and thus, the component separated from the first source may be readily evacuated to the outside of the reaction chamber. For example, when $CCl_4$ is used as the first source, Cl separated from the first source while the first source is activated combines with a hydrogen gas, and is changed to HCl. Thus, the separated component, that is, Cl of the first source, may be readily evacuated to the outside of the reaction chamber. In some embodiments, the hydrogen gas may not be included in the first reaction gas. In some embodiments described with reference to FIGS. 1A through 1F, a case in which a hydrogen gas is further included in the first reaction gas are described.

As described above, the first reaction gas may further include or not include a hydrogen gas, or may include or not include an inert gas, for example, an argon gas in addition to the first source having a C—X structure including a component that belongs to an electron withdrawing group.

Figure 1C:
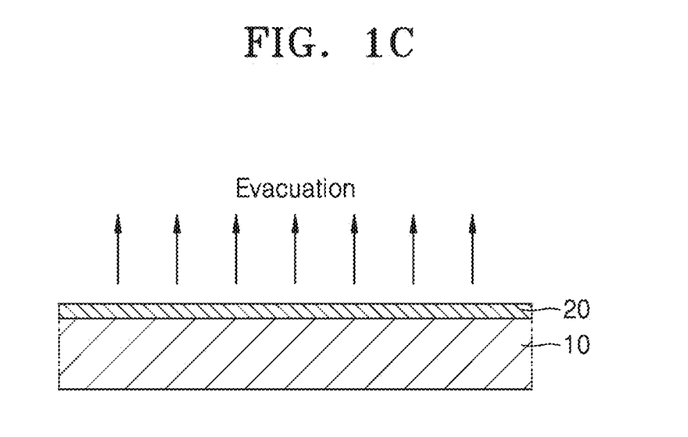

After forming the carbon mono-layer 20 on the substrate 10 by injecting the first reaction gas, as depicted in FIG. 1C, a gas remaining in the reaction chamber may be evacuated to the outside of the reaction chamber before injecting a second reaction gas. Through the gas evacuation process, the first source remaining in the reaction chamber after the carbon mono-layer 20 is formed may be evacuated to the outside of the reaction chamber.

Figure 1D:
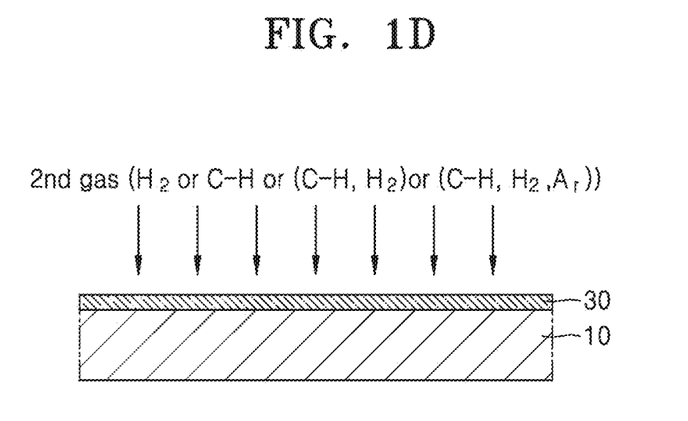

Next, referring to FIG. 1D, in order to grow graphene on the carbon mono-layer 20, a second reaction gas including a second source may be injected into the reaction chamber. The second source may be a source having a functional group that forms a volatile structure in the reaction chamber by reacting with a component that belongs to an electron withdrawing group. For example, the second source may include a hydrogen component. That is, the second source may be a carbon source C—H including a hydrogen component or a hydrogen source. Accordingly, the second reaction gas may include a hydrogen source, a carbon source including a hydrogen component, that is, C—H, or a carbon source C—H including a hydrogen component, and in addition to this, may further include a reducing gas, for example, a hydrogen gas. The second reaction gas may further include an oxidizing gas in addition to the carbon source C—H including a hydrogen component. Also, the second reaction gas may further include an inert gas.

For example, the second reaction gas may include one of $H_2$, C—H, (C—H,$H_2$), and (C—H,$H_2$,Ar).

At this point, the carbon source C—H of the second source may include an aliphatic compound having a carbon number in a range from 1 to 10 and/or an aromatic compound having a carbon number in a range from 1 to 16. For example, the second source may include at least one selected from the group consisting of $H_2$, $CH_4$, $C_2H_4$, $C_2H_2$, and $C_6H_6$.

For example, when a hydrogen source $H_2$ is used as the second source, the second source, that is, the hydrogen source $H_2$ injected into the reaction chamber, may form a volatile structure by reacting with a functional group of carbon C of the activated first source that forms the carbon monolayer 20 by being adsorbed onto the substrate 10. For example, when the first source is $CCl_4$, the activated first source has a $CCl_3$ structure, carbon C of the activated first source is in an adsorbed state onto the substrate 10, a hydrogen source is changed to a volatile structure, that is, a 3HCl gas, by reacting with $Cl_3$, which is a functional group, and only carbon remains on the substrate 10 as an adsorbed state onto the substrate 10, and thus, a graphene monolayer 30 in a state that a secondary adsorption of carbon is possible may be obtained.

Figure 1E:
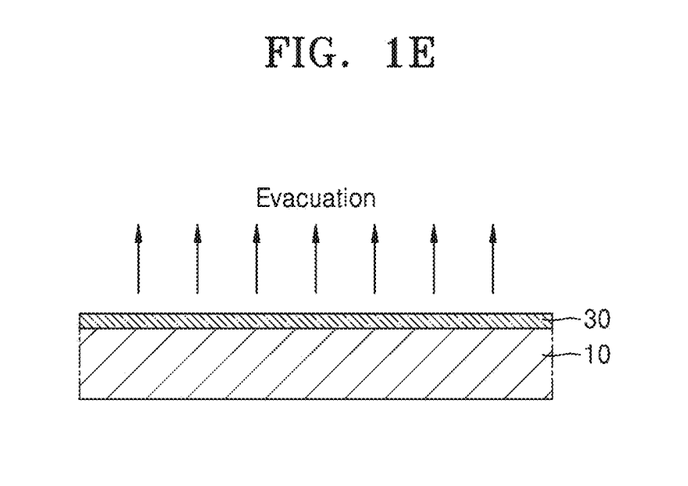

Next, as depicted in FIG. 1E, a gas remaining in the reaction chamber may be evacuated.

In this way, the graphene monolayer 30 obtained in an operation of FIG. 1D is in a state that a secondary adsorption of carbon is possible, and thus, when the operations of FIG. 1B through FIG. 1E are continuously repeated, graphene may be grown as a mono-layer unit.

Referring to FIG. 1D, in an operation of injecting a second reaction gas including the second source into the reaction chamber, when a carbon source including a hydrogen component is used as the second source, the hydrogen component of the second source injected into the reaction chamber may form a volatile structure by reacting with a functional group of carbon C of the activated first carbon source that forms the carbon monolayer 20 by being adsorbed onto the substrate 10, a carbon component of the second source is combined with carbon adsorbed onto the substrate 10, and thus, a secondary adsorption of carbon may be achieved.

Accordingly, the graphene monolayer 30 of at least two layers may be obtained for processes of injecting a first reaction gas and a second reaction gas.

Accordingly, when the processes of FIGS. 1B through 1E are continuously repeated while using a carbon source including a hydrogen component as the second source, graphene may be grown as a monolayer unit of at least two layers. That is, in addition to the graphene monolayer 30 adsorbed by using the first source, at least one more layer of the graphene monolayer 30 may be additionally adsorbed by using a carbon source including a hydrogen component as the second source, and thus, when the processes of FIGS. 1B through 1E are continuously repeated, graphene may be grown in monolayer unit of at least two layers.

For example, when the first source is $CCl_4$ and the second source is $CH_4$, since the activated first source has a $CCl_3$ structure, carbon C of the activated first source is in a state adsorbed onto the substrate 10, and a hydrogen component of the second source is changed to a volatile structure, that is, a 3HCl gas, by reacting with $Cl_3$ which is a functional group of the activated first source, the functional group of the first source is removed from the carbon C adsorbed onto the substrate 10, and the carbon C of the second source is adsorbed onto the carbon of the first source from which the functional group is removed to form an atomic layer. Thus, the graphene monolayer 30 is additionally formed. In this way, even when graphene is grown by using a carbon source including a hydrogen component as the second source of the second reaction gas, a residual gas remaining in the reaction chamber may be evacuated as depicted in FIG. 1E.

Also, the processes of FIGS. 1B through 1E may be repeated for growing graphene, and according to the number of repetitions, a graphene layer having a required thickness may be directly grown on the substrate 10.

That is, in the case when graphene is grown by using a carbon source including a hydrogen component as a second source, when the injections of a first reaction gas and a second reaction gas are repeatedly performed as described above, graphene may be directly grown on a surface of the substrate 10.

Also, since a first source that is a carbon source and includes a component that belongs to an electron withdrawing group is used, a spontaneous activation of the first source is possible, and thus, when the injection of the first reaction gas and the injection of the second reaction gas are repeatedly performed regardless of the process temperature, graphene may be directly grown on the surface of the substrate 10. That is, graphene may be directly grown on the surface of the substrate 10 in a process temperature from room temperature up to 2000° C.

Also, since carbon C of the activated first source is adsorbed onto the substrate 10 and a functional group of the activated first source is combined with the carbon C adsorbed onto the substrate 10, a secondary adsorption of the carbon C that has reactivity with the functional group of the first source is impossible, and thus, the secondary adsorption of the carbon C is controlled. Thus, an atomic layer of carbon C, that is, the carbon monolayer 20, may be formed by the first source, and accordingly, a layer-by-layer growth of graphene may be possible.

Figure 1F:
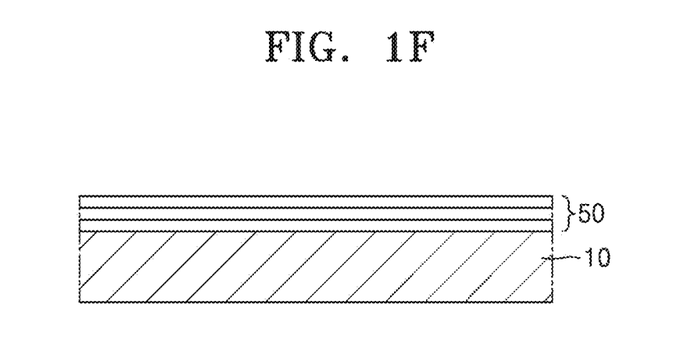

As described above, when the injection of a first reaction gas including the first source that is a carbon source and includes component that belongs to an electron withdrawing group and the injection of a second reaction gas including a second source including a hydrogen component are repeatedly performed, graphene may be directly grown on the surface of the substrate 10. At this point, as the second reaction gas is injected after evacuating a residual gas remaining in the reaction chamber after injecting a first reaction gas, the processes of FIGS. 1B through 1E beginning with the process of FIG. 1B in which the first reaction gas is re-injected after evacuating a residual gas remaining in the reaction chamber after the injection of the second reaction gas may be performed. Graphene may grow as many as the number of repetitions of the processes of FIGS. 1B through 1E, and thus, a graphene layer 50 as depicted in FIG. 1F may be formed.

Figure 2:
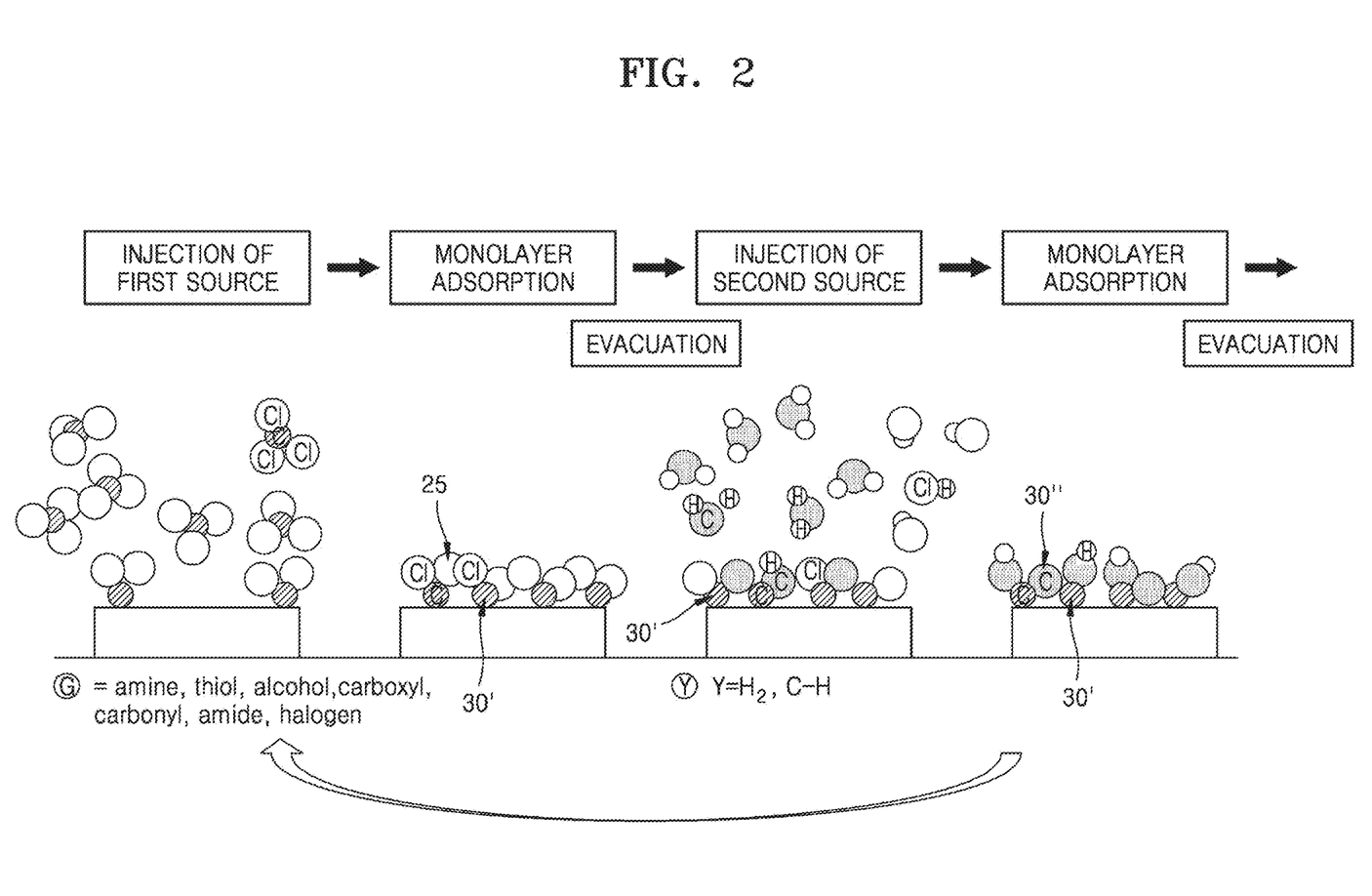
FIG. 2 is a diagram showing a process of growing graphene through atomic layer adsorption of carbon when a first source is $CCl_4$ and a second source is $CH_4$.

FIG. 2 is a diagram showing a process of growing graphene through atomic layer adsorption of carbon when a first source gas is $CCl_4$ and a second source is $CH_4$.

When a first reaction gas including a first source of $CCl_4$ is injected into a reaction chamber, an activated first source has a $CCl_3$ structure and carbon C of the activated first source may be adsorbed onto the substrate 10. At this point, since $CCl_3$ as a functional group 25 is attached to the carbon C that is adsorbed onto the substrate 10, a secondary adsorption of carbon C onto the substrate 10 is impossible, and thus, a graphene monolayer 30' may be obtained by adsorbing the carbon C onto a surface of the substrate 10 to form an atomic layer. After the graphene monolayer 30' is obtained by using the first source, a residual gas remaining in the reaction chamber is evacuated and a second reaction gas including a second source of $CH_4$ may be injected into the reaction chamber. A hydrogen component of the injected second source is changed to a volatile structure, that is, a 3HCl gas, by reacting with $Cl_3$ which is the functional group 25 of the activated first source, and thus, the functional group 25 of the first source is removed from carbon C that is adsorbed onto the substrate 10, and carbon C of the second source is adsorbed onto the carbon C of the first source that forms a graphene monolayer 30' by the removal of the functional group 25, and thus, a graphene monolayer 30" is additionally formed. Afterwards, after evacuating a residual gas in the reaction chamber, when a process of re-injecting the first reaction gas including the first source into the reaction chamber is repeated, a graphene layer having a required thickness may be directly grown on the substrate 10 according to the number of repetitions.

FIG. 2 shows a process of growing graphene through an atomic layer adsorption of carbon, in a first source including a carbon source of a C—X structure, in the case when the X component that belongs to an electron withdrawing group is Cl and the second source is a carbon source including a hydrogen component, for example, $CH_4$.

In the first source having the C—X structure, a functional group may include various components that belong to an electron withdrawing group and may be able to spontaneously separate due to a large electronegativity difference between carbon atoms and the functional group. The components that belong to the electron withdrawing group of the first source may include at least one functional group G selected from the group consisting of amine, thiol, alcohol, carboxyl, carbonyl, amide, and halogen.

For example, of the first source, components that belong to the electron withdrawing group may include at least one selected from the group consisting of Cl, $NH_2$, SH, OH, and COOH.

Also, for example, as indicated on the lower right side of FIG. 2, the second source Y may include various carbon sources C—H including a hydrogen, for example, $CH_4$, $C_2H_4$, $C_2H_2$, and $C_6H_6$. Also, a hydrogen gas may be used as the second source Y. That is, for example, as indicated on the lower right side of FIG. 2, the second source Y may include $H_2$, $CH_4$, $C_2H_4$, $C_2H_2$, or $C_6H_6$.

In some embodiments, when a hydrogen gas is used as the second source, carbon is not additionally adsorbed onto the substrate 10 during a process of injecting a second reaction gas including the second source, and a hydrogen source forms a volatile structure by reacting with a functional group of the first source. Accordingly, only carbon C remains in an adsorbed state on the substrate 10, and thus, a secondary adsorption of carbon C is possible.

As described above, in the first source having the C—X structure, the first source includes a component as a functional group X, wherein the component belongs to an electron withdrawing group in which an electronegativity difference between a carbon atom and a functional group is greater than C—H, and thus, the first source may be activated by spontaneous separation of the functional group. Also, the first source may be activated by using a plasma method as the embodiments described with reference to FIGS. 3A through 3F.

FIGS. 3A through 3F are cross-sectional views for explaining a method of forming graphene according to other embodiments. When FIGS. 3A through 3F are compared with FIGS. 1A through 1F, there is a difference in that a source is activated through a heat treatment process, for example, a plasma process. In FIGS. 3A through 3F, a case is shown that a plasma process is used as an example of heat treatment, but embodiments are not limited thereto, that is, various heat treatment processes may be used. For example, various methods using various heat sources, such as induction heating, radiant heat, lasers, infrared rays, microwaves, ultraviolet rays, and surface Plasmon heating, may be used besides the heat treatment process using plasma, that is, a plasma process.

Figure 3A:
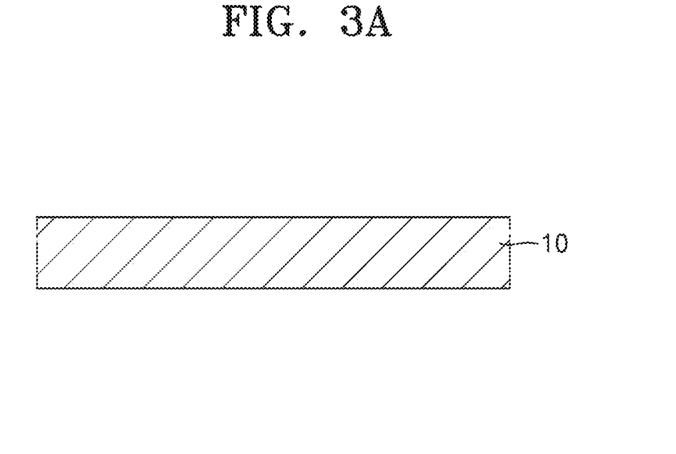
FIGS. 3A through 3F are cross-sectional views for explaining a method of forming graphene.

Referring to FIG. 3A, first, a substrate 10 for growing graphene may be prepared in a reaction chamber (not shown). The substrate 10 may be, for example, pre-treated as described in the previous embodiment before performing a process of growing graphene. The process of pre-treating the substrate 10 may be omitted.

Figure 3B:
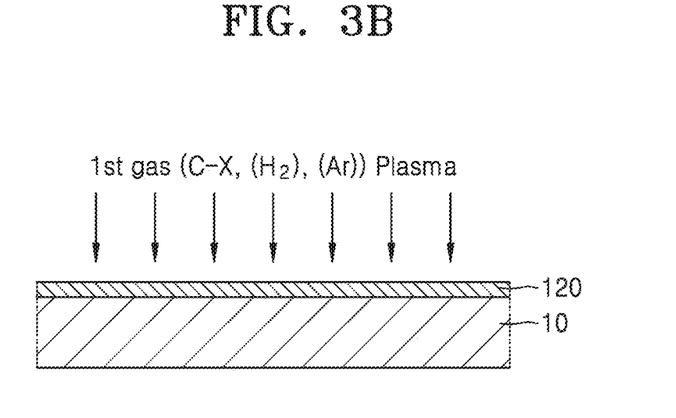

Next, referring to FIG. 3B, power for generating plasma in the inside of the reaction chamber to which the substrate 10 is arranged is applied, and a graphene monolayer 120 may be formed on the substrate 10 by injecting a first reaction gas including a first source.

In order to activate the first source using a plasma method, the first reaction gas may further include an inert gas in addition to the first source having a C—X structure including a component that is a carbon source and belongs to an electron withdrawing group. The inert gas may include at least one of, for example, an argon gas, a neon gas, a nitrogen gas, a helium gas, a krypton gas, and xenon gas. In FIG. 3B, as an example, it is depicted that an argon gas is used as the inert gas.

The first reaction gas may further include a hydrogen gas in addition to the first source and the inert gas. When the first reaction gas further includes a hydrogen gas, a component separated from the first source while the first source is activated combines with the hydrogen gas, and thus, the component separated while the first source is activated may be easily evacuated. For example, when $CCl_4$ is used as the first source, Cl separated while the first source is activated is changed to a HCl gas through combining with a hydrogen gas, and thus, the evacuation of a component, that is, Cl separated from the first source, may be easily achieved. A hydrogen gas may not be included in the first reaction gas. In FIG. 3B, as an example, it is depicted that the first reaction gas further selectively includes an inert gas and a hydrogen gas. In FIG. 3B, the parentheses of the inert gas and the hydrogen gas denote that the inert gas and the hydrogen gas are selectively added. In this way, the first reaction gas may further include or may not include at least one of the inert gas and the hydrogen gas in addition to the first source having the C—X structure including a component that belongs to an electron withdrawing group. In the embodiments described with reference to FIGS. 3A through 3F, a case that an inert gas and a hydrogen gas are further included in the first reaction gas is described as an example.

Meanwhile, power for generating plasma of the first reaction gas may be in a range from about 10 W to about 4000 W, but embodiments is not limited thereto.

A plasma power source may be, for example, a radio frequency (RF) plasma generation device or a microwave (MW) plasma generation device. In order to grow graphene, the RF plasma generation device may generate RF plasma having a frequency in a range from about 3 MHz to about 100 MHz, and the MW plasma generation device may generate MW plasma having a frequency in a range from about 0.7 GHz to about 2.5 GHz. However, the frequency ranges are only examples, and besides the above, other frequency ranges may also be used. Also, as the plasma power source, a plurality of RF plasma generation devices or a plurality of MW plasma generation devices may be used.

When power for generating plasma in the inside of the reaction chamber is applied from a plasma power source, an electric field may be induced in the reaction chamber. In this way, when an electric field is induced in a state that a first reaction gas is injected, plasma for growing graphene may be formed.

A mixing ratio of a first reaction gas, that is, a volume ratio of a first source, an inert gas, and a hydrogen gas injected into the reaction chamber to grow graphene using plasma may be, for example, approximately 0~1:0.01~5000:0~300 (at this point, a volume value of the first source≠0). The volume ratio of the first source, the inert gas, and the hydrogen gas being included in the first reaction gas may be appropriately controlled depending on other growing conditions.

A process temperature for growing graphene may be approximately equal to or less than 2000° C., which is lower than a temperature generally used in CVD processes. For example, in detail, a process temperature of the inside of the reaction chamber may be in a range from about 180° C. to about 2000° C. A process pressure for growing graphene may be in a range from about 0.001 Torr to about 70 Torr. However, these are only examples, and thus, other different process pressures may be used.

In this way, when the first reaction gas including a first source having a C—X structure, an inert gas, and a hydrogen gas flow into the reaction chamber, the first reaction gas is changed to a plasma state by an electric field formed by plasma power applied to the inner side of the reaction chamber, and thus, the first source may be activated. That is, plasma of the inert gas of the first reaction gas activates the first source. In this way, a plasma process may be additionally and selectively applied to the first reaction gas.

For example, when the first source is $CCl_4$, the first source activated by plasma may have, for example, a $CCl_3$ structure and carbon C of the activated first source may be adsorbed onto the substrate 10 as an atomic layer, and thus, a carbon monolayer 120 may be formed.

Figure 3C:
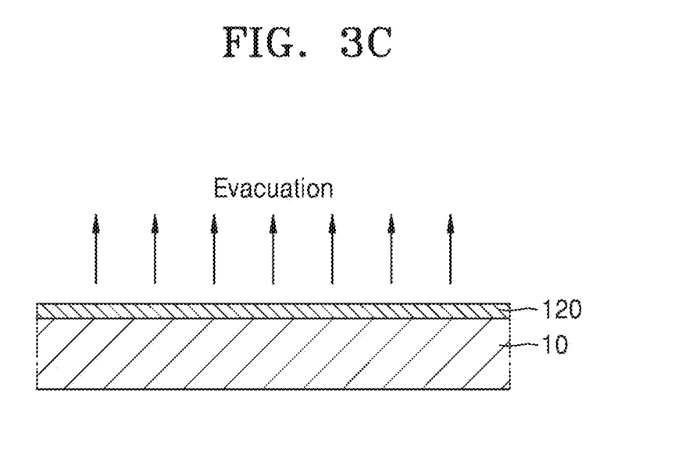

In this way, after the carbon monolayer 120 is formed by changing the first reaction gas injected into the reaction chamber to a plasma state, before injecting a second reaction gas, as depicted in FIG. 3C, a residual gas remaining in the reaction chamber may be evacuated. Through the process of evacuating the residual gas, a residual first source remaining after forming a graphene monolayer may be evacuated to the outside of the reaction chamber. In the process of evacuating a residual gas, the first source, for example, all residual gasses including a carbon source, may be evacuated, and also, a vacuum state of the reaction chamber may be possible. In the process of evacuating the residual gas, it is possible to remove only the first source, for example, a carbon source, it is possible to maintain an inert gas by removing only the carbon and hydrogen sources, and also, it is possible to remove all of the carbon source, the hydrogen source, and the inert gas.

Figure 3D:
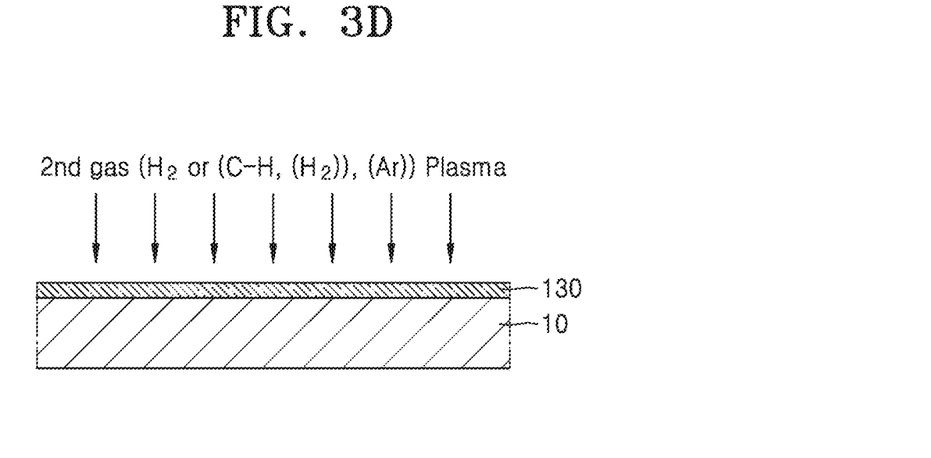

Next, referring to FIG. 3D, in order to grow graphene on the carbon monolayer 120, power for generating plasma in the inside of the reaction chamber is re-applied, and the second reaction gas including a second source may be injected into the reaction chamber. In this way, a plasma process may be additionally and selectively applied to the second reaction gas.

At this point, the second source may be a source having a functional group that forms a volatile structure by reacting with a component that belongs to an electron withdrawing group in the reaction chamber. For example, the second source may include a hydrogen component.

That is, the second source may be a hydrogen source or a carbon source C—H including a hydrogen component. The second source may include at least one selected from the group consisting of $H_2$, $CH_4$, $C_2H_2$, and $C_6H_6$. At this point, a carbon source of the second source may include an aliphatic compound having a carbon number in a range from 1 to 10 and/or an aromatic compound having a carbon number in a range from 1 to 16.

In order to activate the second source by using a plasma method, the second reaction gas may further include an inert gas in addition to the second source. Also, when the second source is a carbon source C—H including a hydrogen component, the second reaction gas may further include a hydrogen gas. The inert gas may include at least one of, for example, an argon gas, a neon gas, a nitrogen gas, a helium gas, a krypton gas, and a xenon gas. In FIG. 3D, as an example, a case is depicted that an argon gas is used. In FIG. 3D, as an example, a case is depicted that an inert gas and a hydrogen gas are further selectively included in the second reaction gas. In FIG. 3D, the parentheses of the inert gas and the hydrogen gas denote that the inert gas and the hydrogen gas are selectively added.

When power for generating plasma in the reaction chamber is applied from a plasma power source, an electric field may be induced in the reaction chamber. In this way, when the electric filed is induced in the reaction chamber in a state that the second reaction is injected, the second reaction gas may be changed to a plasma state by the applied electric field.

For example, power for generating plasma in the reaction chamber is applied from a plasma power source. The power for generating plasma may be in a range of about 10 W to about 4000 W. As described above, the plasma power source may be, for example, at least one RF plasma generation device or at least one MW plasma generation device. When power for generating plasma in the reaction chamber is applied from a plasma power source, an electric field may be induced in the reaction chamber, and in a state when an electric field is induced, a second reaction gas may be injected into the reaction chamber.

For example, when a hydrogen source is used as the second source, an inert gas and the hydrogen source of the second reaction gas injected into the reaction chamber may be changed to a plasma state by the applied electric field.

When the second reaction gas includes the hydrogen source and the inert gas, and graphene is grown by using plasma, a mixing ratio of the second reaction gas, that is, a volume ratio of the inert gas, and a hydrogen gas $H_2$ may be approximately 0.01~5000:0~300. A process temperature may be in a range from about 180° C. to about 2000° C., and a process pressure may be in a range from about 0.001 Torr to about 70 Torr. However, embodiments are not limited thereto.

The hydrogen source activated by plasma forms a volatile structure by reacting with a functional group of carbon C of the activated first source that forms the graphene monolayer 130 by being adsorbed onto the substrate 10. For example, when the first source is $CCl_4$, the activated first source has a $CCl_3$ structure, the carbon C of the activated first source remains in an adsorbed state on the substrate 10, the hydrogen source is changed to a volatile structure, that is, a 3HCl gas, by reacting with the $CCl_3$, which is a functional group of the first source, and only carbon C remains in an adsorbed state onto the substrate 10, and thus, the graphene monolayer 130 from which the functional group is removed may be obtained, and the graphene monolayer 130 is in a state that a secondary adsorption of carbon C is possible.

Figure 3E:
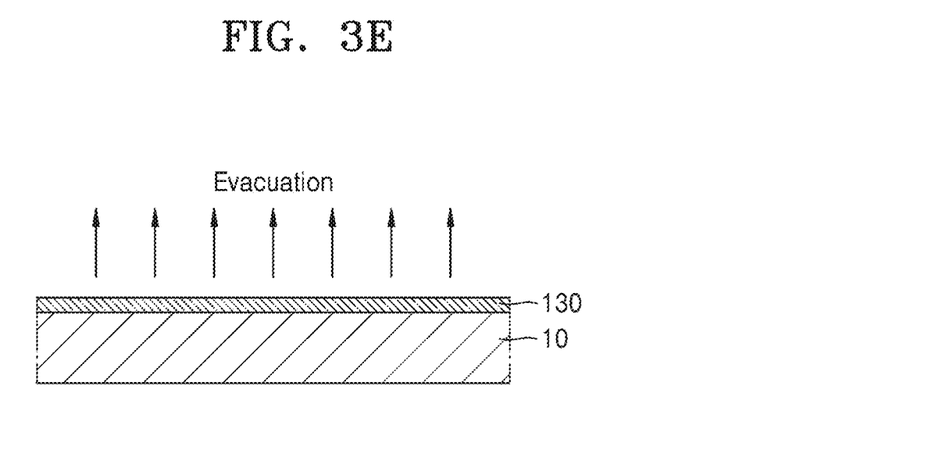

Next, as depicted in FIG. 3E, a residual gas remaining in the reaction chamber may be evacuated.

In this way, since the graphene monolayer 130 obtained in the operation of FIG. 3D is in a state that a secondary adsorption is possible, when the processes of FIGS. 3B through 3E are continuously repeated, graphene may be grown as a monolayer unit.

Referring to FIG. 3D, in an operation of injecting the second reaction gas including the second source into the reaction chamber to further grow graphene on the graphene monolayer 130, when a carbon source C—H including a hydrogen component is used as the second source, the hydrogen component of the second source injected into the reaction chamber forms a volatile structure by reacting with a functional group of carbon C of the activated first source that is adsorbed onto the substrate 10 to form the graphene monolayer 130, and a carbon component of the second source combines with carbon adsorbed onto the substrate 10, and thus, a secondary adsorption of carbon C may be performed. Accordingly, during processes of forming a plasma state by injecting a first reaction gas and forming a plasma state by injecting a second reaction gas, at least two layers of the graphene monolayer 130 may be obtained. At this point, the second reaction gas may further include a hydrogen gas. In FIG. 3D, as an example, a case is depicted that, when the second source is a carbon source C—H including a hydrogen component, the second reaction gas further includes the hydrogen gas.

When the second reaction gas further includes a hydrogen gas and graphene is grown by using plasma, a mixing ratio of the second reaction gas, that is, a volume ratio of a carbon source, an inert gas, and a hydrogen gas may be approximately 1:0.01~5000:0~300. The mixing ratio of the carbon source, the inert gas, and the hydrogen gas included in the second reaction gas may be adjusted differently from that of the first reaction gas. A process temperature may be in a range from about 180° C. to about 2000° C., and a process pressure may be in a range from about 0.001 Torr to about 70 Torr. However, the present embodiment is not limited thereto.

In this way, when the second reaction gas in which a carbon source including a hydrogen component, an inert gas, and a hydrogen gas are mixed in a predetermined or alternatively, desired, ratio enters the reaction chamber, the second reaction gas is changed to a plasma state by an electric field generated by plasma power. Plasma of the inert gas of the second reaction gas activates the carbon source, and thus, the graphene monolayer 130 from which a functional group is removed may be obtained. Carbon may be additionally adsorbed to the graphene monolayer 130 as an atomic layer, and thus, at least one layer of the graphene monolayer 130 may be additionally formed.

Accordingly, when the processes of FIGS. 3B through 3E are continuously repeated while using a carbon source including a hydrogen component as the second source, graphene may be grown in monolayer unit of at least two layers. That is, at least one layer of the graphene monolayer 130 may be adsorbed by using a carbon source including a hydrogen component as the second source in addition to the graphene monolayer 130 adsorbed by using the first source, and thus, when the processes of FIGS. 3B through 3E are continuously repeated, graphene may be grown in monolayer unit of at least two layers.

For example, when the first source is $CCl_4$ and the second source is $CH_4$, the first source activated by plasma may have a $CCl_3$ structure, carbon C of the activated first source remains in an adsorbed state on the substrate 10, the hydrogen component of the second source is changed to a volatile structure, that is, a $3HCl$ gas, by reacting with $Cl_3$, which is a functional group of the activated first source, and thus, the functional group of the first source is removed from the carbon C that is adsorbed onto the substrate 10, and carbon of the second source is adsorbed to the carbon C of the first source from which the functional group is removed to form an atomic layer, and thus, the graphene monolayer 130 is additionally formed.

In this way, in the case when graphene is grown by using a carbon source including a hydrogen component as a second source of a second reaction gas, as depicted in FIG. 3E, residual gas remaining in the reaction chamber may be evacuated.

Also, in order to grow graphene, the processes of FIGS. 3B through 3E may be repeated, and according to the number of repetitions, a graphene layer having a required thickness may be directly grown on the substrate 10.

That is, even when graphene is grown by using a carbon source including a hydrogen component as a second source of a second reaction gas, when the injection of the first reaction gas and the injection of a second reaction gas are repeatedly performed as described above, graphene may be directly grown on a surface of the substrate 10.

Figure 3F:
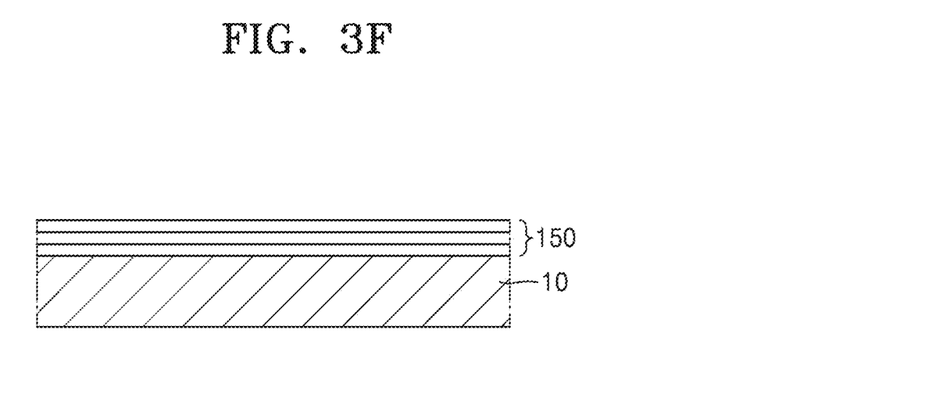

When the processes of injecting a first reaction gas and changing the first reaction gas to a plasma state and injecting a second reaction gas and changing the second reaction gas to a plasma state described above are repeatedly performed, graphene may be directly grown on the surface of the substrate 10. At this point, as the second reaction gas is injected after evacuating a residual gas remaining in the reaction chamber after the injection of the first reaction gas, the processes of FIGS. 3B through 3E may be repeated by re-starting the operation of FIG. 3B in which the first reaction gas is re-injected after evacuating a residual gas remaining in the reaction chamber after the injection of the second reaction gas. As many as the repetition of the processes of FIGS. 3B through 3E, a graphene layer 150 as depicted in FIG. 3F may be grown.

In the descriptions above, it is described and depicted that processes are performed by changing both the first reaction gas and the second reaction gas to plasma states. However, it is also possible that the plasma process may be applied with respect to one of the first reaction gas and the second reaction gas.

For example, a first source having a C—X structure that constitutes the first reaction gas includes a component as a functional group X, wherein the component belongs to an electron withdrawing group in which an electronegativity difference between a carbon atom and a functional group that is greater than that of between C and H, and thus, the first source may be activated by spontaneous separation of the functional group. Accordingly, when a process for forming a graphene monolayer without forming a plasma state with respect to the first reaction gas and a process for forming a plasma state with respect to the second reaction gas are repeatedly performed, a graphene layer having a required thickness may be grown on the substrate 10.

Also, the manufacturing process may include a process for forming a plasma state with respect to the first reaction gas and not include a process of forming a plasma state with respect to the second reaction gas. When these processes are repeatedly performed, a graphene layer having a required thickness may be grown on the substrate 10.

In the method of forming graphene according to the present disclosure, graphene may be directly grown on a surface of a substrate by repeatedly performing the injection of a first reaction gas including a first source that includes a component that is a carbon source and belongs to an electron withdrawing group and the injection of a second reaction gas including a second source including a hydrogen component. Since the first source includes the component that belongs to an electron withdrawing group, the first source may be spontaneously activated. Carbon of the activated first source is adsorbed onto the substrate as an atomic layer. At this point, a functional group of the activated first source is combined with carbon adsorbed onto the substrate, and thus, a secondary adsorption of carbon that has reactivity with the functional group of the first source is impossible, that is, a secondary adsorption of carbon is controlled. Therefore, graphene may be grown layer-by-layer by repeatedly performing the injections of the first reaction gas and the second reaction gas.

While one or more embodiments have been described with reference to the figures, it will be understood by those of ordinary skill in the art that various changes in form and details may be made therein without departing from the spirit and scope as defined by the following claims.

What is claimed is:

1. A method of forming graphene, the method comprising:
    forming a carbon monolayer on a substrate by injecting a first reaction gas into a reaction chamber, wherein the first reaction gas comprises a first source being a carbon source and including a component that belongs to an electron withdrawing group, the first reaction gas being activated by spontaneous separation of the carbon source and the components;
    injecting a second reaction gas including a second source into the reaction chamber, wherein the second source includes a functional group that forms a volatile structure by reacting with the component that belongs to the electron withdrawing group of an activated first reaction gas such that an activated carbon source of the first reaction gas remains on the substrate forming graphene; and
    evacuating a residual gas between the injections of the first reaction gas and the second reaction gas,
    wherein the graphene is directly grown on a surface of the substrate by repeatedly injecting the first reaction gas and the second reaction gas.

2. The method of claim 1, wherein the first source comprises a component that belongs to an electron withdrawing group in which an electronegativity difference between a carbon atom and a functional group is greater than that of between carbon and hydrogen.

3. The method of claim 2, wherein the component that belongs to an electron withdrawing group of the first source comprises at least one functional group selected from the group consisting of amine, thiol, alcohol, carboxyl, carbonyl, amide, and halogen.

4. The method of claim 1, wherein the second source comprises a hydrogen component.

5. The method of claim 4, wherein the second source comprises a hydrogen source or a carbon source including a hydrogen component.

6. The method of claim 5, wherein the carbon source including the hydrogen component of the second source comprises at least one of an aliphatic compound having a carbon number in a range from 1 to 10 and an aromatic compound having a carbon number in a range from 1 to 16.

7. The method of claim 6, wherein the second source comprises at least one selected from the group consisting of $H_2$, $CH_4$, $C_2H_4$, $C_2H_2$, and $C_6H_6$.

8. The method of claim 1, wherein at least one of the first reaction gas and the second reaction gas further comprises at least one of a reducing gas, an oxidizing gas, and an inert gas.

9. The method of claim 1, further comprising heat treating, wherein the graphene is directly grown on the substrate through the heat treating.

10. The method of claim 9, wherein a plasma process is selectively and additionally applied with respect to the injection of at least one of the first reaction gas and the second reaction gas.

11. The method of claim 8, wherein the inert gas comprises at least one of an argon gas, a neon gas, a nitrogen gas, a helium gas, a krypton gas, and a xenon gas.

12. The method of claim 1, wherein the first source comprises at least one of an aliphatic compound having a carbon number in a range from 1 to 10 and an aromatic compound having a carbon number in a range from 1 to 16.

13. The method of claim 1, wherein the substrate comprises at least one of a Group IV semiconductor material, a semiconductor compound, a metal, and an insulating material.

14. The method of claim 13, wherein the semiconductor compound comprises a material in which at least two of Si, Ge, C, Zn, Cd, Al, Ga, In, B, C, N, P, S, Se, As, Sb, and Te are combined.

15. The method of claim 13, wherein the metal comprises at least one of Cu, Mo, Ni, Al, W, Ru, Co, Mn, Ti, Ta, Au, Hf, Zr, Zn, Y, Cr, and Gd or an alloy of these metals.

16. The method of claim 13, wherein the insulating material comprises at least one of Si, Al, Hf, Zr, Zn, Ti, Ta, W, and Mn or at least one of oxide, nitride, and carbide of at least one of Si, Ni, Al, W, Ru, Co, Mn, Ti, Ta, Au, Hf, Zr, Zn, Y, Cr, Cu, Mo, and Gd and a derivative of these materials.

17. The method of claim 16, wherein the at least one of the oxide, nitride, and carbide, and the derivative of these materials further comprises hydrogen.

18. The method of claim 1, wherein the direct growing of graphene on the surface of the substrate is performed at a temperature equal to or less than 2000° C.

19. The method of claim 1, wherein the carbon monolayer includes carbon bonded to the component that belongs to the electron withdrawing group.

* * * * *